(12) United States Patent
Krista (10) Patent No.: US 12,548,320 B2
(45) Date of Patent: Feb. 10, 2026

(54) DETECTING AND FORECASTING SOLAR FLARES

(71) Applicant: The Regents of the University of Colorado, Denver, CO (US)

(72) Inventor: Larisza D. Krista, Erie, CO (US)

(73) Assignee: The Regents of the University of Colorado, Denver, CO (US)

( * ) Notice: Subject to any disclaimer, the term of this patent is extended or adjusted under 35 U.S.C. 154(b) by 475 days.

(21) Appl. No.: 17/985,727

(22) Filed: Nov. 11, 2022

(65) Prior Publication Data

US 2023/0154178 A1     May 18, 2023

Related U.S. Application Data

(60) Provisional application No. 63/278,932, filed on Nov. 12, 2021.

(51) Int. Cl.
    *G06V 20/13*         (2022.01)
    *G06V 10/22*         (2022.01)
    *G06V 10/36*         (2022.01)

(52) U.S. Cl.
    CPC ............. *G06V 20/13* (2022.01); *G06V 10/22* (2022.01); *G06V 10/36* (2022.01)

(58) Field of Classification Search
    CPC ........ G06V 20/13; G06V 10/22; G06V 10/25; G06V 10/36; G06V 10/50; G06V 10/761; G06T 5/40
    See application file for complete search history.

(56) References Cited

FOREIGN PATENT DOCUMENTS

| | | | |
|---|---|---|---|
| CN | 105372723 A | * 3/2016 | .............. G01W 1/10 |
| EP | 2560129 A1 | * 2/2013 | .......... G06K 9/0063 |
| JP | 2019197323 A | * 11/2019 | |

OTHER PUBLICATIONS

Pérez-Suárez, David and Higgins, Paul A. and Bloomfield, D. Shaun and McAteer, R.T. James and Krista, Larisza D. and Byrne, Jason P. and Gallagher, Peter. T. "Automated Solar Feature Detection for Space Weather Applications." 2011, IGI Global, pp. 207-225. (Year: 2011).*

Colak, Tufan and Rami Qahwaji. "Automatic Sunspot Classification for Real-Time Forecasting of Solar Activities." 2007 3rd International Conference on Recent Advances in Space Technologies (2007): 733-738. (Year: 2007).*

Alasta, Amro F.A. "Development of digital imaging technologies for the segmentation of solar features and the extraction of filling factors from Sodism images." 2018, Bradford Scholars. (Year: 2018).*

(Continued)

*Primary Examiner* — Sumati Lefkowitz
*Assistant Examiner* — Anna Lei
(74) *Attorney, Agent, or Firm* — Workman Nydegger (57) ABSTRACT

A system for forecasting when solar flares will occur and identifying their possible locations creates a mask to analyze an image of a solar disk. The system also creates an intensity histogram using the solar disk. Additionally, the system stores a resulting full-disk image and a sub-image identifying possible flare signature sites. Further, the system applies a method to filter out false positive detections by using an equation that enhances true positive pre-flare signatures and minimizes false positive signatures.

20 Claims, 9 Drawing Sheets

(56) References Cited

OTHER PUBLICATIONS

Chen, Y., Manchester, W. B., Hero, A. O., Toth, G., Dufumier, B., Zhou, T., et al. Identifying solar flare precursors using time series of SDO/HMI Images and Sharp Parameters. (2019). Space Weather, 17, 1404-1426. (Year: 2019).*

Jonas, E., Bobra, M., Shankar, V. et al. Flare Prediction Using Photospheric and Coronal Image Data. (2018). Sol Phys 293, 48. (Year: 2018).*

X. Zhang, J. Liu and Q. Wang, "Image feature extraction for solar flare prediction," 2011 4th International Congress on Image and Signal Processing, Shanghai, China, 2011, pp. 910-914, doi: 10.1109/CISP.2011.6100295. (Year: 2011).*

* cited by examiner

DETECTING AND FORECASTING SOLAR FLARES

CROSS-REFERENCE TO RELATED APPLICATIONS

This application claims the benefit of and priority to U.S. Provisional Patent Application Ser. No. 63/278,932 filed on 12 Nov. 2021 and entitled "DETECTING AND FORECASTING SOLAR FLARES," which application is expressly incorporated herein by reference in its entirety.

STATEMENT REGARDING FEDERALLY SPONSORED RESEARCH

This invention was made with government support under grant number 1931062 awarded by the National Science Foundation. The government has certain rights in the invention.

BACKGROUND

Solar flares (or simply "flares") have been linked to some of the most significant space weather hazards on Earth. These hazards include, but are not limited to, radio blackouts and energetic particle events. These hazards can start just minutes after a solar flare onset.

Significant extreme-ultraviolet (EUV) and X-ray radiation occurs at the time of a flare. This radiation can be observed at the flare's "footpoints," where plasma is heated by nonthermal electron beams. Electrons are accelerated through magnetic reconnection, and some of them travel down along the magnetic field lines to bombard deeper layers of the Earth's atmosphere. Notably, higher-energy electrons are able to pass deeper into the atmosphere and lead to EUV radiation at the flare footpoints.

A review of the 2003 Oct. 28 ×17 class flare showed that magnetic shear in the flare region was found to have decreased significantly during the impulsive phase of the flare. EUV brightenings were also found before the hard X-ray emission, which appeared to be associated with the main-phase flare. Based on such findings, it is reasonable to assume that the EUV brightenings that occurred before the X-ray emission have the same generation mechanism as the ones that appeared during the flare. Evidence can also be presented that, with a highly sensitive instrument and the right processing tools, pre-flare EUV signatures can be detected for all magnitudes of flares and potentially used for space weather forecasting. Accordingly, what is needed is an improved technique for identifying and predicting flare events.

This background is provided to illustrate only one exemplary technology area where some embodiments described herein may be practiced.

BRIEF SUMMARY

Disclosed embodiments include methods and systems for forecasting when solar flares will occur and identifying their possible locations. Disclosed embodiments create a mask to analyze an image of a solar disk. Disclosed embodiments then create an intensity histogram using the solar disk. Additionally disclosed embodiments, store a resulting full-disk image and a sub-image identifying possible flare signature sites. Further, disclosed embodiments apply a method to filter out false positive detections by using an equation that enhances true positive pre-flare signatures and minimizes false positive signatures.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

The disclosed embodiments are directed to a Detection and EUV Flare Tracking (DEFT) tool, which provides the ability to identify flare signatures and their precursors using high spatial and temporal resolution extreme-ultraviolet (EUV) solar observations.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

One unique advantage of DEFT is its ability to identify small but significant EUV intensity changes that may lead to solar eruptions. Furthermore, the tool can beneficially identify the location of the disturbances and distinguish events occurring at the same time in multiple locations.

The disclosed techniques and algorithms analyze high temporal cadence observations obtained from the Solar Ultraviolet Imager (SUVI) instrument aboard the GOES-R satellite. In a study of 61 flares of various magnitudes observed in 2017, the "main" EUV flare signatures (those closest in time to the X-ray start time) were identified on average 6 minutes early (relative to traditional techniques) using the disclosed techniques. The "precursor" EUV signatures (second-closest EUV signatures to the X-ray start time) appeared on average 14 minutes earlier relative to conventional techniques.

Also worthwhile to note, the embodiments are beneficially directed to an operational version of DEFT and can simulate and test its real-time use. A fully operational DEFT has the potential to significantly improve space weather forecast times. These and numerous other benefits will now be described in more detail throughout the remaining portions of this disclosure.

Flare Characteristics

As mentioned previously, significant extreme-ultraviolet (EUV) and X-ray radiation occurs at the time of a flare. This radiation can be observed at the flare footpoints, where plasma is heated by nonthermal electron beams. The electrons are accelerated through magnetic reconnection, and some of them travel down along the magnetic field lines and bombard deeper layers of the atmosphere. Notably, higher-energy electrons are able to pass deeper into the atmosphere and lead to EUV radiation at the flare footpoints. A review of the 2003 October 28×17 class flare showed that magnetic shear in the flare region was found to have decreased significantly during the impulsive phase of the flare. EUV brightenings were also found before the hard X-ray emission, which appeared to be associated with the main-phase flare.

Based on such findings, it is reasonable to assume that the EUV brightenings that occurred before the X-ray emission have the same generation mechanism as the ones that appeared during the flare. Evidence can be presented showing how, with a highly sensitive instrument and the right processing tools, pre-flare EUV signatures can be detected for all magnitudes of flares and potentially used for space weather forecasting.

Understanding the physical processes leading to solar flares and developing tools to identify them early are highly desirable for space weather forecasting. Solar flares can cause a number of space weather hazards on Earth. For instance, the X-ray radiation from flares increases the ionization of the ionosphere, thereby potentially leading to high-frequency radio blackouts. Additionally, the energetic particles from flares can disrupt technological systems and human activities in space. Even further, since the radiation originating in the flares travels at the speed of light, the impacts are often felt at the same time as when the flares are detected.

Over the past decade, there have been some advancements in flare forecasting. Some prediction tools utilize rudimentary machine-learning (ML) methods in order to forecast the likelihood of flares occurring in the next 24 hrs. Some of these traditional methods claim to have relatively high skill scores for forecasting flares. However, these evaluations are often dependent on the database used and on the type of performance metrics chosen. For instance, the results from these traditional techniques showed that while many methods performed above the "no skill" level, none of the operational flare forecasting methods performed above 0.5 across all evaluation metrics. Note, 0.5 is the value halfway between "no skill" and "perfect." Therefore, these traditional techniques are still not optimal for forecasting flares.

Furthermore, ML methods can be computationally heavy, and they can require multiple data inputs that might not be readily available in real time. Their success is also often dependent on the initial training dataset. For this reason, most of these traditional techniques are not ready for operational, real-time space weather forecasting. While there is value in forecasting the possibility of a flare within the next 24 hrs., in the realm of operational space weather preparedness, there is even more value in forecasting an impending flare within the next hour. A shorter, more precise lead time can give industries and agencies vulnerable to space weather disturbances a chance to minimize interruption to services and operations.

Among the flare prediction tools that do not use ML, such tools heavily rely on microwave radiation signatures in order to predict the possibility of a flare within the next 24 hrs. In one scenario, 14 active regions were studied, and it was shown that increases in the photospheric resistive heating rate in active regions were correlated with the occurrence of M and X flares a few hours to a few days later. Some studies have analyzed the predicting capabilities of a so-called Lu and Hamilton self-organized-criticality avalanche model. In the cases studied, it was found that in more than half of the cases there was enough information to predict large or extreme events.

Flare forecast methods are often difficult to compare because they analyze different datasets. For instance, 11 statistical forecast methods have been reviewed and systematically compared. These methods rely on photospheric magnetic field and continuum intensity observations. The comparative study showed that none of the methods stood out or achieved high skill score values.

One study investigated ensemble forecasting for major solar flares by linearly combining full-disk probabilistic forecasts from six operational forecasting methods. A total of 28 ensembles were created to study M- and X-class flare forecasts. They found that the majority of ensembles performed not only better than the ensemble members alone but also better than the equal-weights ensemble. While this is a promising result, an ensemble forecasting method would be more computationally heavy and require more time to provide a forecast, compared to just one model. Such an ensemble might also rely on data that are not readily available in real time.

With that understanding, one will begin to appreciate some of the challenges involved with constructing a real time, consistent, and robust flare forecasting method, especially when competitive forecast methods should be designed to rely primarily on data that are acquired near real time. Without the real time data, even the best forecasting tool will fall short when put into operational use.

In order to mitigate the impacts of flare-related space weather events, it is highly desirable to identify flares as early as possible. Ideally, not only would the flares be identified as they happen but the prediction about those flares would occur in advance. However, the latter is still a major challenge. This difficulty in predictive capability indicates that there is still much to discover about the physics of flares (e.g., how flares are initiated, whether there are different processes that trigger flares, the potential differences between flare initiation mechanisms, when these mechanisms start and when/if they are observable by currently available instruments, and whether the magnetic configuration of an active region is a key factor in the initiation, recurrence, and magnitude of flares).

Flare Detection

Flares have been and are still primarily detected using space-based instruments measuring solar X-ray irradiance (e.g., the XRS instrument aboard the GOES spacecraft). However, these measurements suffer from several important limitations, which also affect the globally trusted flare detection methods used by the National Oceanic and Atmospheric Administration Space Weather Prediction Center (NOAA/SWPC).

Firstly, since X-ray irradiance is an integrated signal, the location of the source region is unknown (it is identified manually after the fact). Furthermore, with the irradiance, there are issues regarding whether the signal came from one or more regions and issues regarding how the distribution of the signal changed over time.

Secondly, in order to avoid false detections due to small variations in the coronal background, SWPC's detection method requires a rise in the total X-ray irradiance for at least 4 consecutive minutes and a total increase of at least 40% before it registers a flare. Hence, there is an inherent delay in this flare detection method. Also, XRS is not sensitive enough to identify weak flare precursor signatures that might be evident in solar imagery but not in the total X-ray irradiance of the Sun.

As mentioned above, this approach is also limited when co-temporal flares occur: a second flare can be detected only after the irradiance drops below 50% of the difference between the pre-flare flux and the peak flare flux. This means that the method sometimes fails to appropriately identify flares that occur at or around the same time in different locations on the Sun. Typical forecasting scenarios only allow for alerts, issued when flare irradiance reaches a certain threshold, and follow-up summary messages are generally issued well after the peak of a flare event. At SWPC, alerts are issued when irradiance reaches the M5 level flare threshold, with no pre-alert warning.

Improved Techniques for Detecting Flares

The disclosed techniques improve on current operational flare detection strategies using state-of-the-art, real-time, low-latency observations from the Solar Ultraviolet Imager (SUVI) instrument aboard the GOES-R satellite. Preliminary tests of the new detection method—the Detection and EUV Flare Tracking, aka DEFT-reveal improvements of several minutes in main-phase flare alert times, and over 10 minutes in precursor signature detection. Furthermore, the embodiments can also detect and separately track concurrent events. These improvements can yield important gains in prediction times for solar flares, and they could allow warnings to be issued in advance of the primary onset of a major flare-which traditionally has not been possible.

Instrumentation and Observations

SUVI is a normal-incidence EUV Ritchey-Chretien telescope that observes the solar atmosphere in six ultraviolet passbands—93, 131, 171, 195, 284, and 304 Å—corresponding to emission from ion species at a range of temperatures between about 50,000 K and 20 MK. SUVI images are approximately 53.3×53.3 arcmin, 1280×1280 pixel square images with a plate scale of 2.5 arcsec. Each SUVI instrument operates at a cadence of 10 s, obtaining images at a variety of wavelengths and exposure times.

Narrowband images, such as those used from SUVI, are capable of distinguishing plasma at a wide range of temperatures, and they are sensitive to a variety of possible signs of flare onset that can occur before the production of high-temperature plasma (generally observed in X-rays). Because different passbands correspond to ion species at different temperatures, various narrowband image channels respond differently to flares depending on when and where heating or cooling of the flare-associated plasma is occurring.

The overall sensitivity of the EUV images used by the embodiments allows for the detection of very small, localized changes in radiance that would not be detectable in integrated flux measurements. Furthermore, SUVI observations provide imaging (as opposed to integrated signals), which allows the embodiments to resolve the locations of flares and their temporal changes. Thus, the embodiments are able to distinguish events that are happening at or around the same time, which is impossible with irradiance observations.

On global scales, EUV emission tends to brighten sometime after more energetic emissions like X-rays. However, smaller features typically brighten at or before the onset of eruptions, particularly in high-temperature channels where plasma might be energized by the initial onset of magnetic reconnection. Indeed, structures that are clearly associated with reconnection in a current sheet are identified as being the earliest signs of an eruptive flare. These bright structures are relatively small, so they do not significantly influence the total solar irradiance early in the flare and might not be detectable in irradiance measurements. However, they could be detectable in EUV images.

Deft Flare Detection Techniques

DEFT is able to identify solar flares of space weather relevance in EUV observations quickly, consistently, and with minimal computational overhead. A catalog of 61 flares from 2017 have been assembled, using GOES-R 16/SUVI data. Their magnitude and X-ray start time data points were stored and analyzed using the SWPC flare database. Additional data, such as GOES/SUVI EUV observations before and after the recorded flare start times, was also obtained. This was done in order to identify possible EUV signatures before the flare X-ray start time or afterward, if none were identified beforehand.

The efficiency of the six available SUVI wavelengths at detecting pre-flare EUV signatures was also reviewed. The temporal cadence for some wavelengths is not optimal: the 131, 171, and 284 Å wavelength observations have a cadence of 4 minutes, which could mean a 4-minute delay in detection.

The 94 Å wavelength observations have higher cadence (2 minutes), but they are best for observing the main-stage flare (multimillion-kelvin corona signatures). For the 94 Å wavelength the signature comes after the X-ray start time, so it also may not be optimal for forecasting. The 195 Å wavelength has a higher cadence (1 minute) but detects a lot of intensity fluctuations and is also better for observing the main-stage flare (after the X-ray start time).

The 304 Å wavelength observations are higher cadence (2 minutes), and they capture pre-flare signatures in the transition region/chromosphere (<100,000 K). For this reason the current version of DEFT relies primarily on the 304 Å wavelength.

From this point on, the analysis is fully automated: the DEFT algorithm first creates a mask to analyze a disk in the observation. This mask is centered on and is slightly larger than the solar disk. The mask allows the embodiments to exclude any erroneous signatures that could occur off-disk but include flare signatures that occur on-disk, or even slightly above the limb. Next, an intensity histogram is created using the observed disk. The histogram helps distinguish high-intensity flare and pre-flare signatures from the rest of the disk. The resulting full-disk image and sub-image of the possible flare signature site are stored, as well as the physical properties of the signature, such as, for example, heliographic location, EUV intensity peak, pixel count, and the corresponding running difference values.

High-intensity signatures can also appear at the same time, in different locations. For this reason, a spatial discriminator that groups together high-intensity pixels based on their spatial proximity (within 10 degrees only, to avoid other regions) has been developed and helps distinguish separate regions of activity. This means that separate regions can be analyzed and a determination can be made as to which ones display pre-flare activity and which ones do not. The signal in a group is summed and treated as one source. Once the signature groups are created, DEFT can determine whether any group has trespassed the threshold, and it can flag possible pre-flare activity. DEFT also determines the location of the activity—a beneficial factor in understanding and providing alerts for flares that could pose a real risk of space weather hazards such as radio blackouts and risks to GPS navigation, extravehicular activities (EVAs), and satellite operations.

Figure 1:
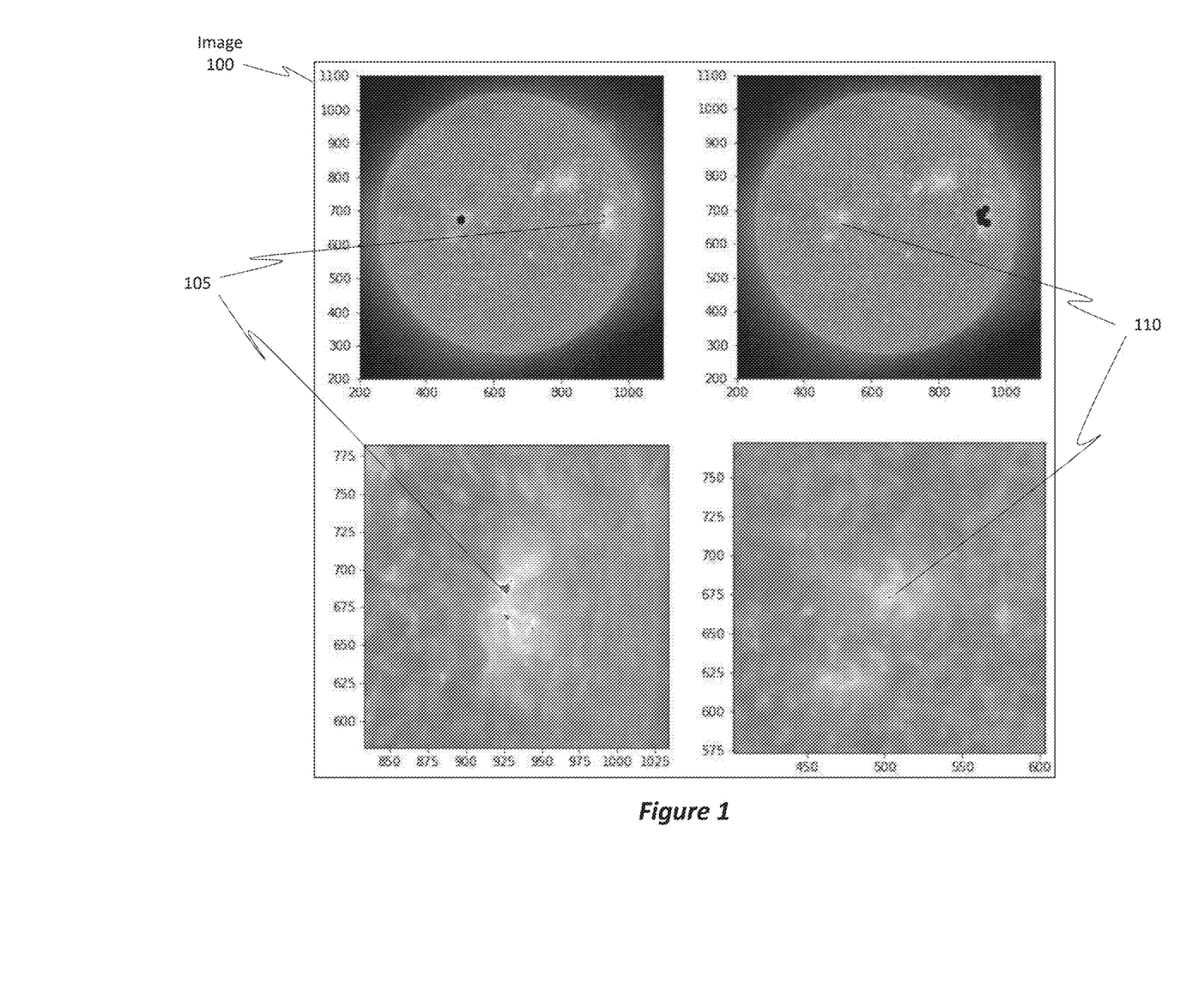
FIG. 1 illustrates observations taken at a 304 Å wavelength with GOES-R/SUVI, where the DEFT tool provides accurate measurement and tracking of EUV signals originating in different regions.

FIG. 1 shows an image 100 comprising an observation where two high-intensity EUV sources were identified: AR 12673 near the west limb (label 105), and AR 12677 in the eastern hemisphere (label 110). A third region—AR 12674—is visible in the NW quadrant, but this region did not contain pixels with high enough intensity, and hence that region will not be discussed.

The high-intensity pixels were located, grouped together based on their proximity, and labeled as two separate sources. This process is performed to accurately determine the EUV intensity at any given time and to track temporal changes in each location separately. The image was taken with the GOES/SUVI instrument on 2017 Sep. 7 at 9:45 UTC. The top panels show the same observation but highlight each region of interest separately and block out the other region for processing and easier visual discrimination. The below panels show a zoomed-in image of the corresponding regions of interest. The panels on the left show the pre-flare EUV signal source that was linked to an M1.4 flare in AR 12673, with an X-ray start time of 9:49 UTC on 2017 Sep. 7.

Once the EUV observations were processed with DEFT, the embodiments identified the signatures that appeared right before the flares. Using the start time from the SWPC flare catalog, the last two EUV signatures at or before the X-ray start time were identified and recorded. If no EUV signature at all was observed within an hour before the flare, the first signature after the X-ray start time was recorded. As used herein, the signature closest to the X-ray start time is referred to as the "main signature" and the signature observed even earlier is referred to as the "precursor signature."

Once the pre-flare EUV signatures were identified for each of the 61 flares in the catalog, their properties were statistically analyzed. The desire is to better understand the EUV signatures that happen right before the X-ray flare (e.g., how/if the EUV signature properties are linked to flare magnitude, what their characteristics are, how early they occur, and whether they could be used for early space weather warnings). Identifying relationships between the X-ray flare properties and the EUV signatures could be used to develop DEFT into a real-time operational tool that could improve and/or complement the currently used X-ray-based forecasting system at SWPC.

Detecting the start of a flare even a few minutes early would be significant in itself since it would allow space weather alerts to be issued earlier than it has been possible until now. Advantageously, there is an indication that pre-flare EUV signatures are detectable for B-, C-, M-, and X-class flares several minutes early before the X-ray start time.

Accordingly, the spatial discrimination process of DEFT allows the accurate measurement and tracking of EUV signals originating in different regions. The images in FIG. 1 showed the same observation taken at the 304 Å wavelength with GOES-R/SUVI on 2017 Sep. 7 at 9:45 UTC. Each image highlights one source (105 and 110); the other source is blocked out with black. The lower image panels show a close-up of the corresponding region of interest (the left panels highlight AR 12673; the right panels highlight AR 12677). A pre-flare signal was identified in AR 12673 (see left panels) and was linked to an M1.4 flare that started at 9:49 UTC.

Results of Detecting Flares

The SUVI instrument provides observations in six different wavelengths. In at least one embodiment, the 304 Å wavelength is used. That wavelength may be the most sensitive and successful in identifying both precursors and main-stage events. Using the 2017 GOES X-ray flare catalog, 61 flares were selected: 4 X-class (the only X-class flares in 2017), 19 M-class, 19 C-class, and 19 B-class flares. For every flare in the catalog a "main" EUV signature was identified. However, for 1 X-class and 1 M-class flare (both limb flares), and for 2 C and 8 B flares, no "precursor" EUV signature was found. Aside from the 61 flares discussed herein, three small flares with no EUV signatures at all (a B1, a B2, and a B3 flare) were also found.

Figure 2:
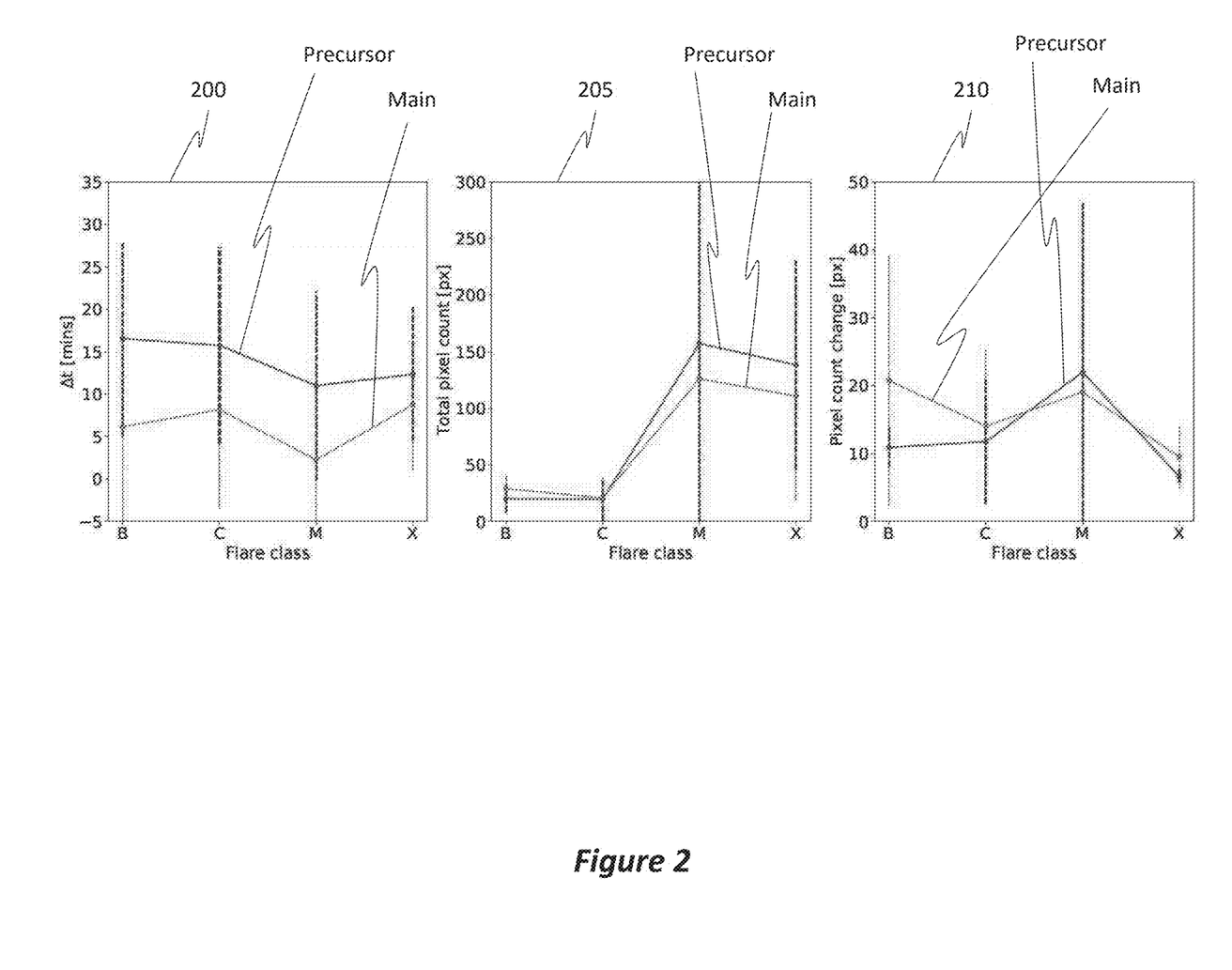
FIG. 2 illustrates (i) a mean $\Delta t$, (ii) a total pixel count, and (iii) a pixel count change for each flare class.

The main and precursor signatures were analyzed separately for each flare class. FIG. 2 shows three graphs, namely graph 200, graph 205, and graph 210. Graph 200 shows the mean $\Delta t$. Graph 205 shows the total pixel count. Graph 210 shows the pixel count change for each flare class. $\Delta t$ is the time difference between the EUV signal and the flare X-ray start time. Total pixel count is the total number of pixels in the EUV flare signature. The pixel count change is the change in the flare pixel numbers when the EUV pre-flare signal was identified.

In more detail, graph 200 shows the time difference ($\Delta t$); graph 205 shows the total pixel count; and graph 210 shows the pixel count change averaged for each class. $\Delta t$ signifies the time between the EUV pre-flare signal and the official start of the X-ray are. Total pixel count refers to the total number of EUV pre-flare signature pixels. The pixel rate of change is the change in the signature pixel numbers at the time when the EUV pre-flare signal was detected. The precursor signal is the second to last signal before the official X-ray start time, and the main EUV signal is the last signal before the official X-ray start time. The typical mean $\Delta t$ values for EUV precursors were 17, 16, 11, and 12 minutes for B-, C-, M-, and X-class flares, respectively. The typical mean $\Delta t$ values for the main EUV signals were 6, 8, 2 and 9 minutes early for B-, C-, M and X class flares, respectively.

These times are emphasized in order to compare them to the X-ray start time. Compared to the NOAA/SWPC alerts, the embodiments beneficially gain an additional 4 minutes at least. This means that apart from the M-class main signatures, across all classes, the embodiments recorded EUV signature times that were over 10 minutes earlier than the earliest SWPC alert times. Also, the graph 205 shows that M- and X-class flares were observed to have significantly higher pixel count rates on average. This result will be useful in developing DEFT's ability to estimate flare magnitudes.

Figure 3:
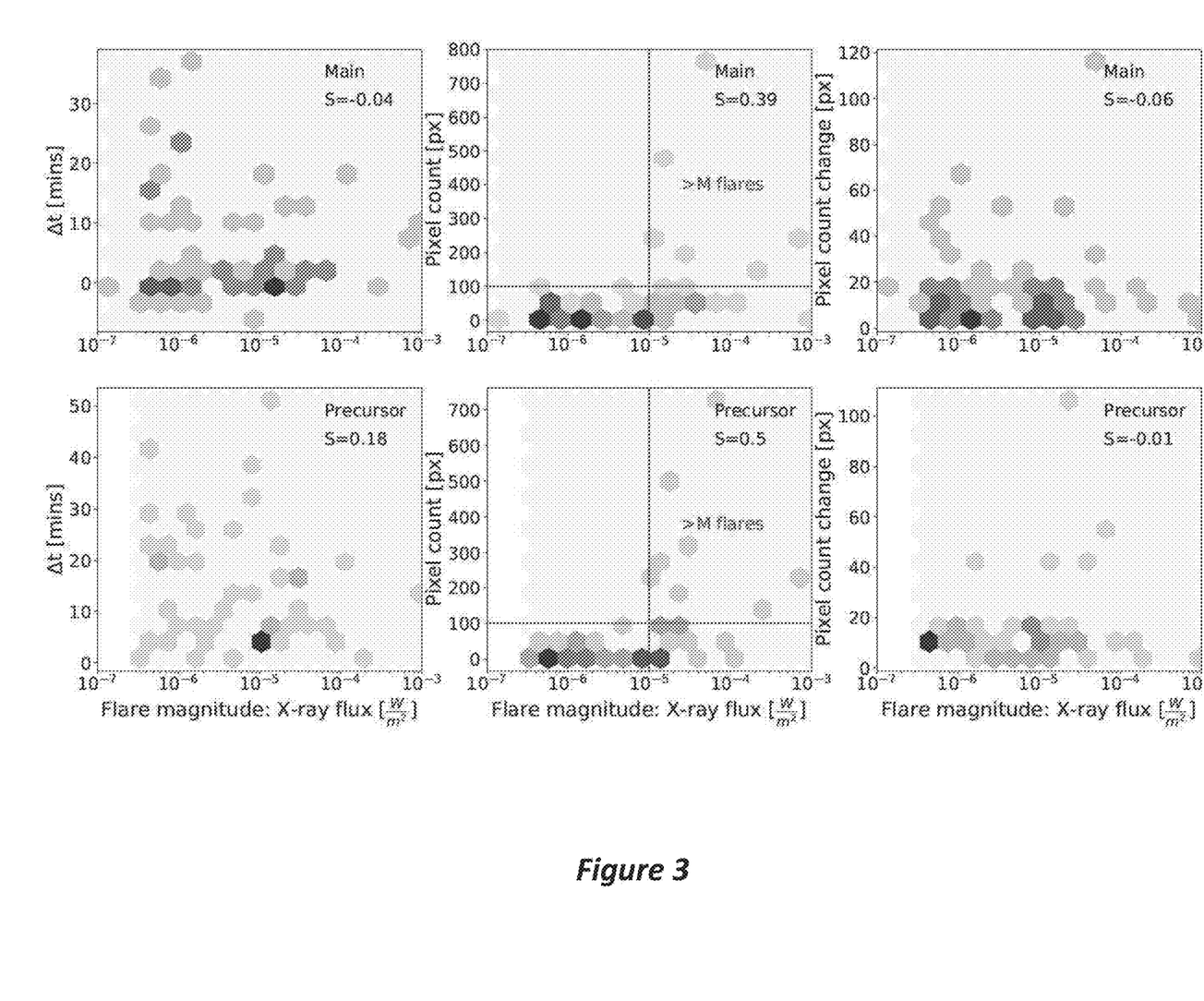
FIG. 3 illustrates various "main" and "precursor" signal properties.

The top row in FIG. 3 shows density scatter plots for the main signal properties (darker color indicates higher density). From left to right, the density scatter plots show $\Delta t$, total pixel count, and the pixel count change. The bottom panels show the same values from left to right for precursor signatures. The Spearman(S) correlation values are shown in each panel. The highest correlation is between the flare magnitude and the pixel count for both precursor and main signatures (middle panels in FIG. 3): the Spearman correlation coefficient is 0.39 (p-value=0.0017) and 0.5 (p-value=0.0003), respectively. This indicates a moderate positive monotonic relationship between flare magnitude and the EUV signature pixel count. The location of the flux equivalent of an M1 flare is also highlighted (vertical line in the middle panels). More than 90% of the data points for pixel count were under 100 counts. Note that pixel counts over 100 (shown with a horizontal line) only occur for M- and X-class flares—for both main and precursor signals.

Note that a p-value of less than 0.05 suggests a statistically significant correlation, and the identified values were considerably lower. No other significant correlation was found between the flare magnitudes and the EUV properties listed. The embodiments also calculated the Pearson correlation values, but these were very low and not statistically significant.

Figure 4:
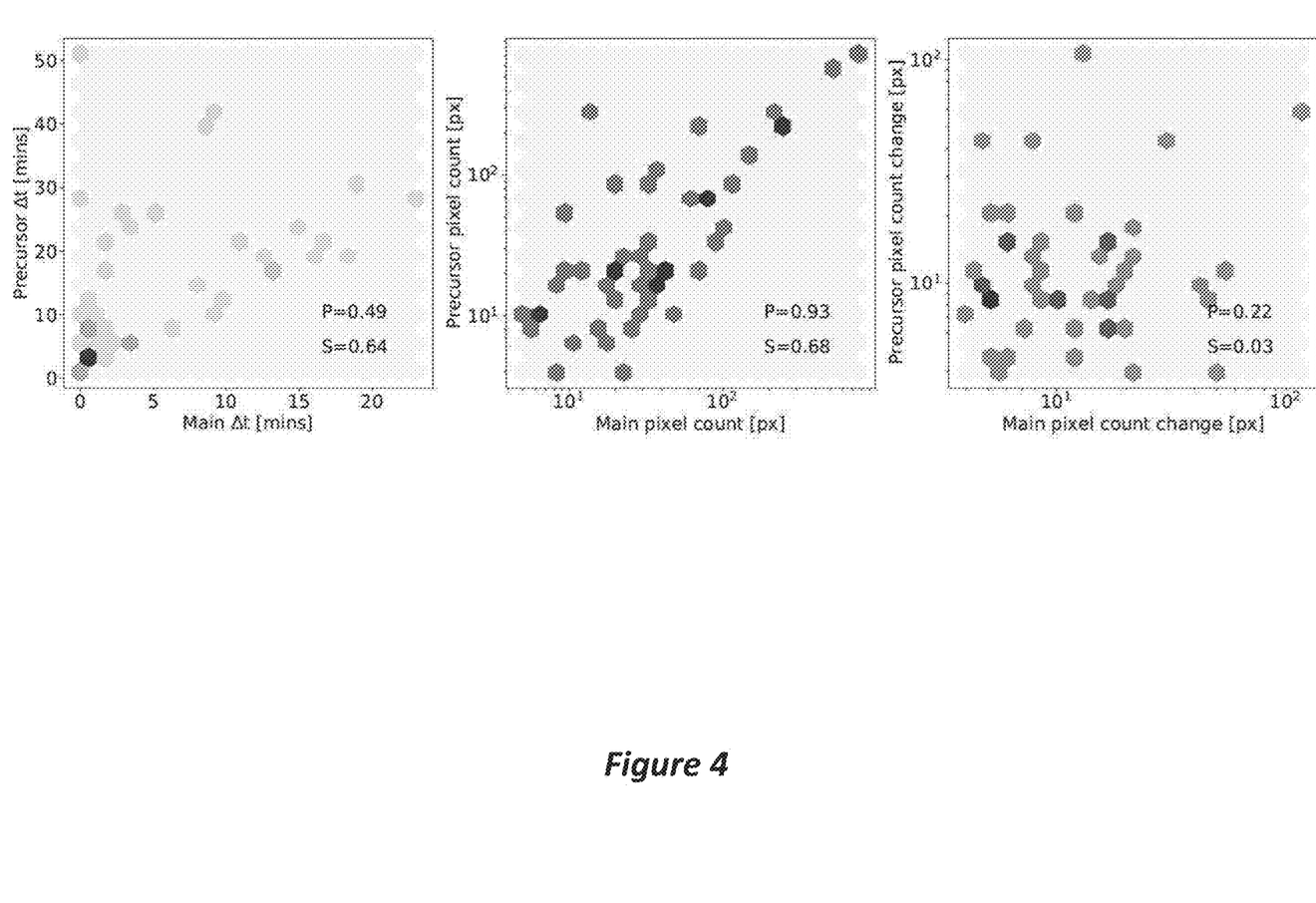
FIG. 4 illustrates various density scatter plots showing the main and precursor signal properties relative to each other. The Pearson (P) and Spearman(S) correlation values are listed in each panel.

The embodiments also analyzed the relationship between main and precursor signal properties, as shown in FIG. 4. The left panel of FIG. 4 shows that the $\Delta t$ values of main and precursor signals have a moderate Pearson (P=0.49) and strong Spearman (S=0.64) correlation with p-values well below 0.001. This indicates that earlier precursor signals could be accompanied by earlier main signals. A strong correlation was found between the main and precursor pixel count values (middle panel of FIG. 4): the Pearson and Spearman correlation coefficients were 0.93 and 0.68, respectively. The p-values were significantly below 0.001 for both. This suggests that larger precursor pixel counts tend to be accompanied by larger main signal pixel counts. No correlation was found between the pixel count change values (right panel of FIG. 4).

Figure 5A:
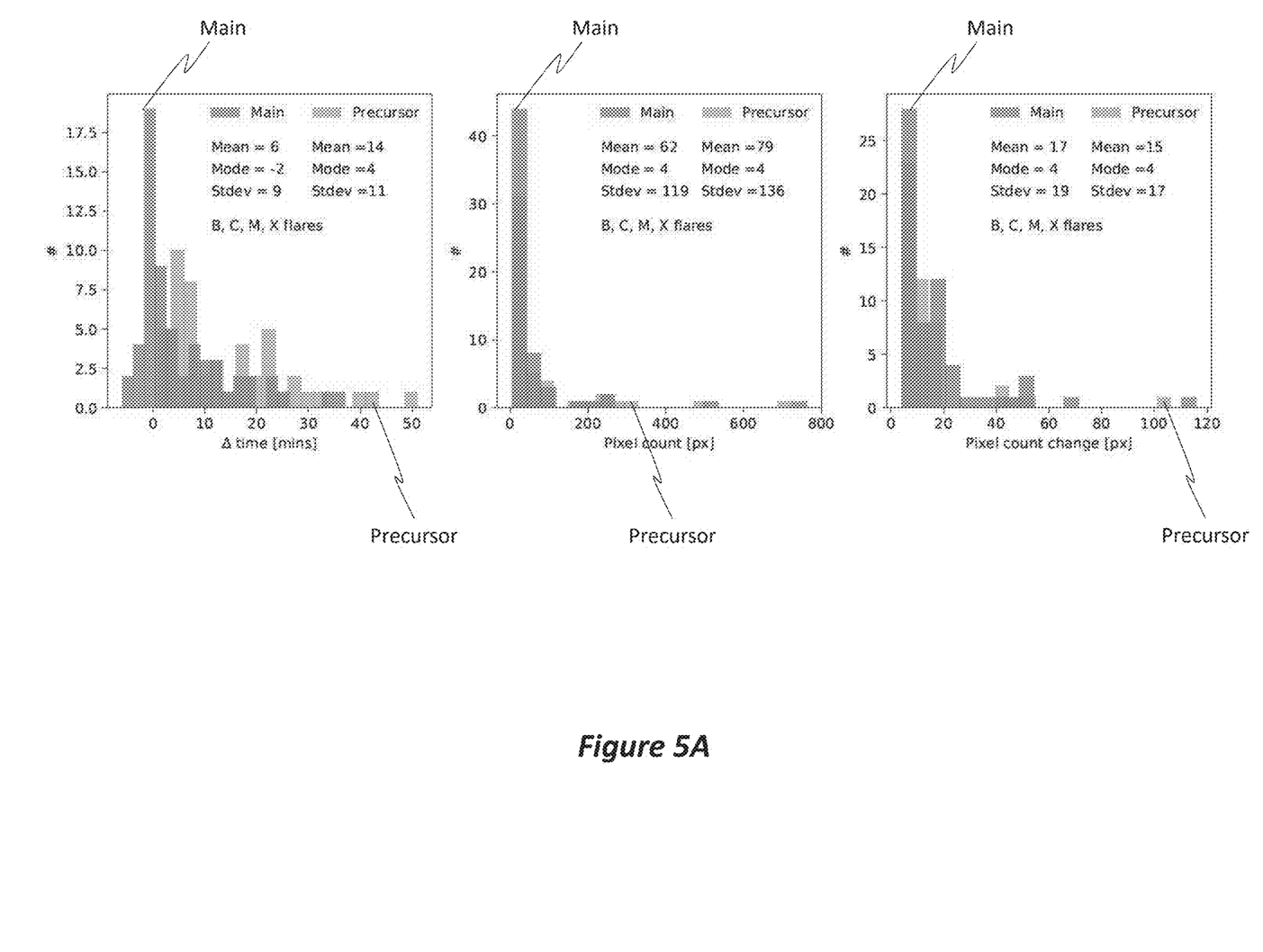
FIGS. 5A, 5B, and 5C illustrate histograms showing the $\Delta t$ values (left panels), the pixel count values (middle panels), and the pixel count change values (right panels).
Figure 5B:
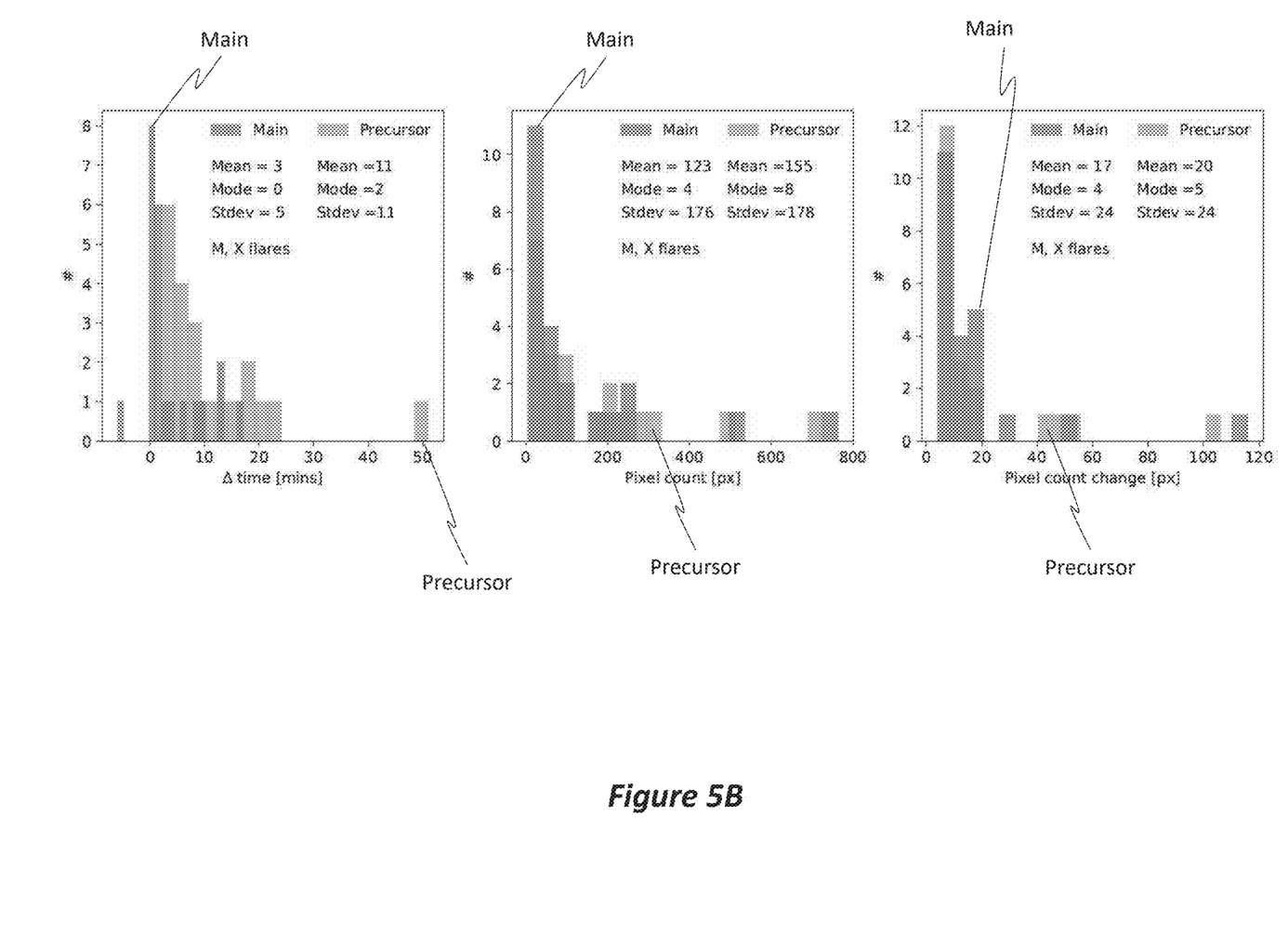
Figure 5C:
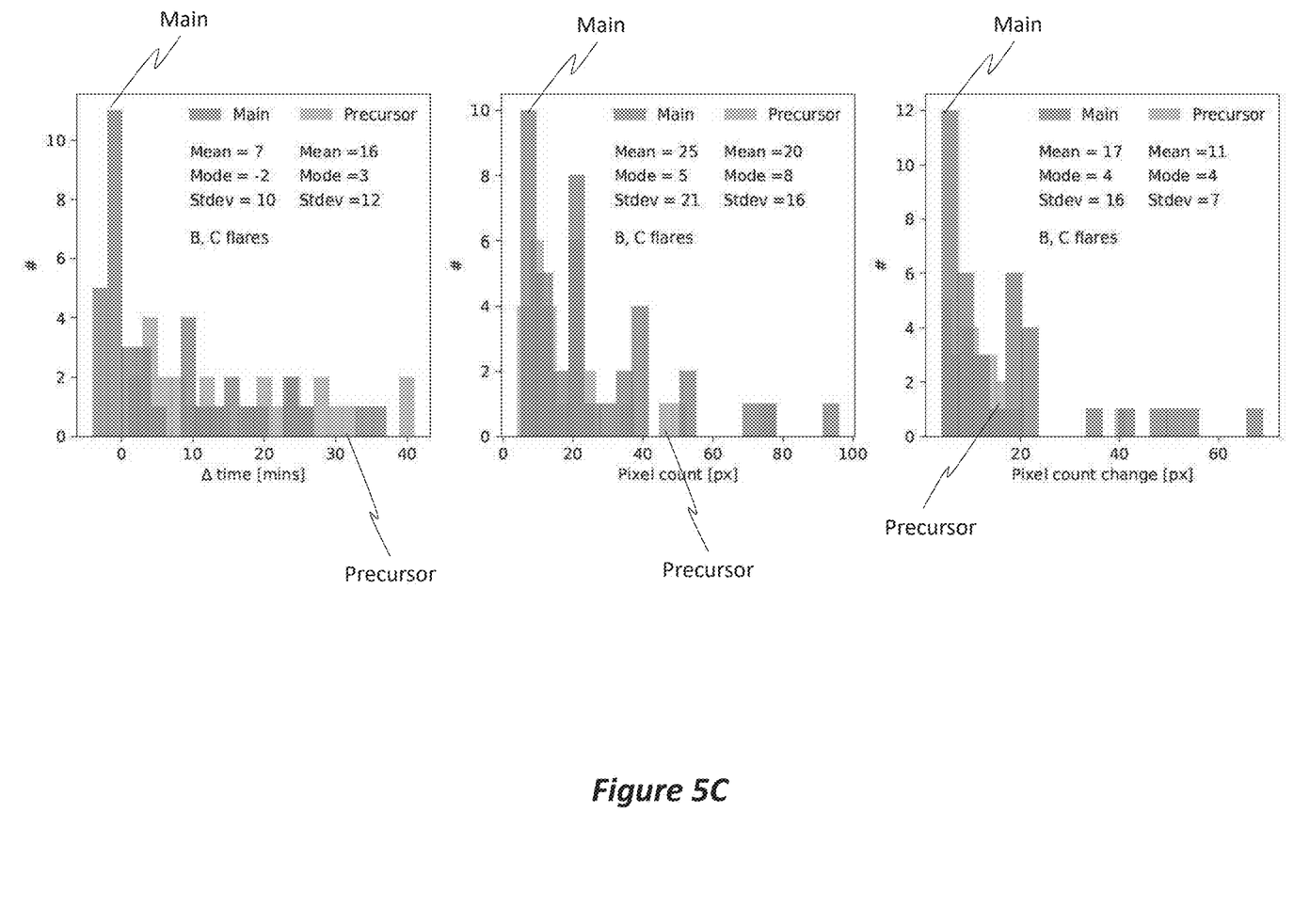

FIGS. 5A, 5B, and 5C show histograms of the $\Delta t$ values (left panels in FIGS. 5A, 5B, and 5C), the pixel count values (middle panels in FIGS. 5A, 5B, and 5C), and the pixel change values (right panels in FIGS. 5A, 5B, and 5C). FIG. 5A shows values for all flare magnitudes (B, C, M, and X). FIG. 5B shows values for only M- and X-class flares (perhaps the most relevant flares for space weather forecasting). FIG. 5C shows values for the Band C flares only (these have low or no space weather impact). The histogram for the precursor values is labeled, and the main signal values are also labeled. The mean, mode, and standard deviation values for the main and precursor signatures are listed under the corresponding labels.

Across all magnitudes, the embodiments identified precursors on average 14 minutes, and main flare signatures 6 minutes earlier than the X-ray flare start time. For M and X flares combined, this value was lower: 11 and 3 minutes, respectively. For B and C flares, this value was considerably higher: 16 and 7 minutes, respectively.

The total pixel count of EUV signatures across all flare magnitudes was on average 79 for precursors and 62 for the main signal. This value was significantly higher for M and X flares combined: 155 pixels for precursors and 123 for main signatures. For B and C flares, this value 249 was significantly lower: 20 for precursors and 25 pixels for the main signature.

Across all magnitudes, the average pixel count change was 15 and 17 pixels for precursors and main signals, respectively. These values were a little higher for the high-magnitude flares: 20 and 17 pixels, respectively. For low-magnitude flares, these values were somewhat lower: 11 and 17 pixels, respectively.

This shows that while M and X flares could be identified a little later than B- and C-flares, they can have significantly higher pixel counts than B and C class flares. Considering pixel count change values, larger flares demonstrate only slightly higher values.

When assembling the catalog, seven B flares and three C flares that transitioned behind the limb were excluded, since signatures could not be identified. However, in two cases (an M-class and an X-class flare), the main-stage flare was observed despite the fact that the active region was mostly behind the limb (these cases are in the catalog). For one flare DEFT identified no signal in the hour before the flare; the only signal identified was 6 minutes after the X-ray start time. This was an M-class flare at the solar limb that started on 2017 Oct. 10 at 23:10 UTC and was identified by DEFT at 23:16 UTC using existing data. Records show that SWPC identified it as a flare at 23:35 UTC (25 minutes after the X-ray start time), and the alert was issued at 00:27 UTC the next day (77 minutes after the X-ray start time). Hence, the identification time by DEFT was still at least 19 minutes earlier than the first recorded SWPC identification time.

The above-mentioned cases suggest that the main-stage EUV signatures of higher-magnitude (M and X) flares might still be observable by DEFT if the active region is at or slightly behind the observable limb, but the precursor signatures are lost and also most of the smaller (B and C) flare signatures. A review of the data indicates that detecting the EUV flare signatures becomes more challenging at the solar limb.

Detection of pre-flare EUV signatures has the potential to not only improve space weather forecasting but also help the world better understand the physical mechanisms leading to a flare. Higher-energy electrons are able to penetrate deeper into the atmosphere (i.e. chromosphere). This finding is in alignment with the fact that the 304 Å observations, which are optimal for imaging the chromosphere, were the best for identifying pre-flare brightenings using DEFT. Furthermore, since the flare-related EUV radiation occurs near the flare footpoints, it could explain why the pre-flare EUV signals were harder to detect near the limb using DEFT. The closer the flare footpoints are to the limb, the more the EUV signal decreases owing to line-of-sight obscuration.

The X17 flare of 2003 Oct. 28 was analyzed in EUV and hard X-ray observations. Magnetic shear in the flare region that decreased significantly during the impulsive phase of the flare was found. EUV brightenings were also found before the hard X-ray emission, which appeared to be associated with the flare EUV brightenings. EUV brightenings that occurred before the X-ray emission might have been generated through the same mechanism as the brightenings that appeared during the flare.

Relevant observations show that these pre-flare EUV brightenings are common-they were observed in all the flares studied. They can be detected for flares of all magnitudes, which suggests that there is a similar process at work regardless of the magnitude of the flare. It is unclear why the signatures appear earlier for B and C flares and closer to the main phase for M and X flares. Small (B and C) flares have smaller EUV signatures (less than 100 pixel counts), while larger (M and X) flares can have both small and larger EUV signatures (up to 800 pixels). This means that a larger pre-flare EUV signature could indicate a larger instability in a region and therefore could help the embodiments estimate the magnitude of a flare. The pre-flare EUV brightenings might be caused by micro-reconnections that temporarily relieve some of the instability in the region until the region reaches critical instability and erupts. In order to better understand the processes leading to a flare, further case studies can be performed to investigate the evolution of the intensity of pre-flare EUV brightenings and their location relative to the magnetic inversion line and the main-phase EUV flare signal.

Accordingly, the disclosed embodiments are directed to a novel approach to identify pre-flare EUV signatures within the hour before the X-ray start time. DEFT can identify pre-flare EUV intensity spikes in just a few pixels. It is a fast and robust tool that can locate a pre-flare signature on the solar disk within seconds. This is also possible because DEFT uses state-of-the-art data, such as high temporal and spatial cadence full-disk EUV observations from the GOES/SUVI instrument that are available in near real time and are not affected by saturation.

Traditional ML flare forecasting methods typically offer only a binary prediction 24 hrs. ahead, and they include a considerable false detection margin. Alerts 24 hrs. ahead are certainly beneficial, but those limit the scope of mitigation. For instance, many instruments and infrastructures cannot be shut down for a whole day in preparation for a flare. Some forecast centers provide percentage chance flare forecasts but still heavily rely on now-casting (i.e. identifying the flare as it happens and alerting after the event has already begun.) Now-casting is often too late to mitigate the effects of flare-related high-energy particles impacting sensitive instruments or astronauts in extravehicular activities (EVAs). The disclosed tool provides alerts early enough for space weather mitigation purposes, while also minimizing the time needed to put instruments into safe mode before the impact of high-energy particles related to flares.

The embodiments improve space weather alert times by identifying and understanding EUV signatures before flares occur. The embodiments also provide a tool that can consistently detect the flares. The last two EUV signatures were identified before 61 flares of various magnitudes. A "main" EUV signal was consistently identified on average 6 minutes, and a "precursor" EUV signal on average 14 minutes before the X-ray start time. It was also found that when separating M- and X-class flares from B- and C-class flares (based on the severity of their potential space weather impact), the higher class flares could have significantly higher pixel count values. In some embodiments, this result can be used to estimate flare magnitudes in the future.

Furthermore, it was found that higher precursor pixel counts are positively correlated with higher main signal pixel counts, which means that the precursor could help to determine the expected magnitude even earlier. By studying flares close to the limb, the limitations of DEFT were identified (e.g., EUV signals occurring close to the limb have less lead time compared to the X-ray start time). This is likely due to line-of-sight observational limitations in EUV.

The DEFT tool can be adapted to run on a large blind database; it can be adapted to identify pre-flare EUV signatures; it can be adapted to filter out false positives; and it can be adapted to make sure all large flares are detected. This process essentially simulates operational use. In this regard, DEFT can be run on real-time GOES/SUVI data to improve flare forecast times.

Example Method(s)

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
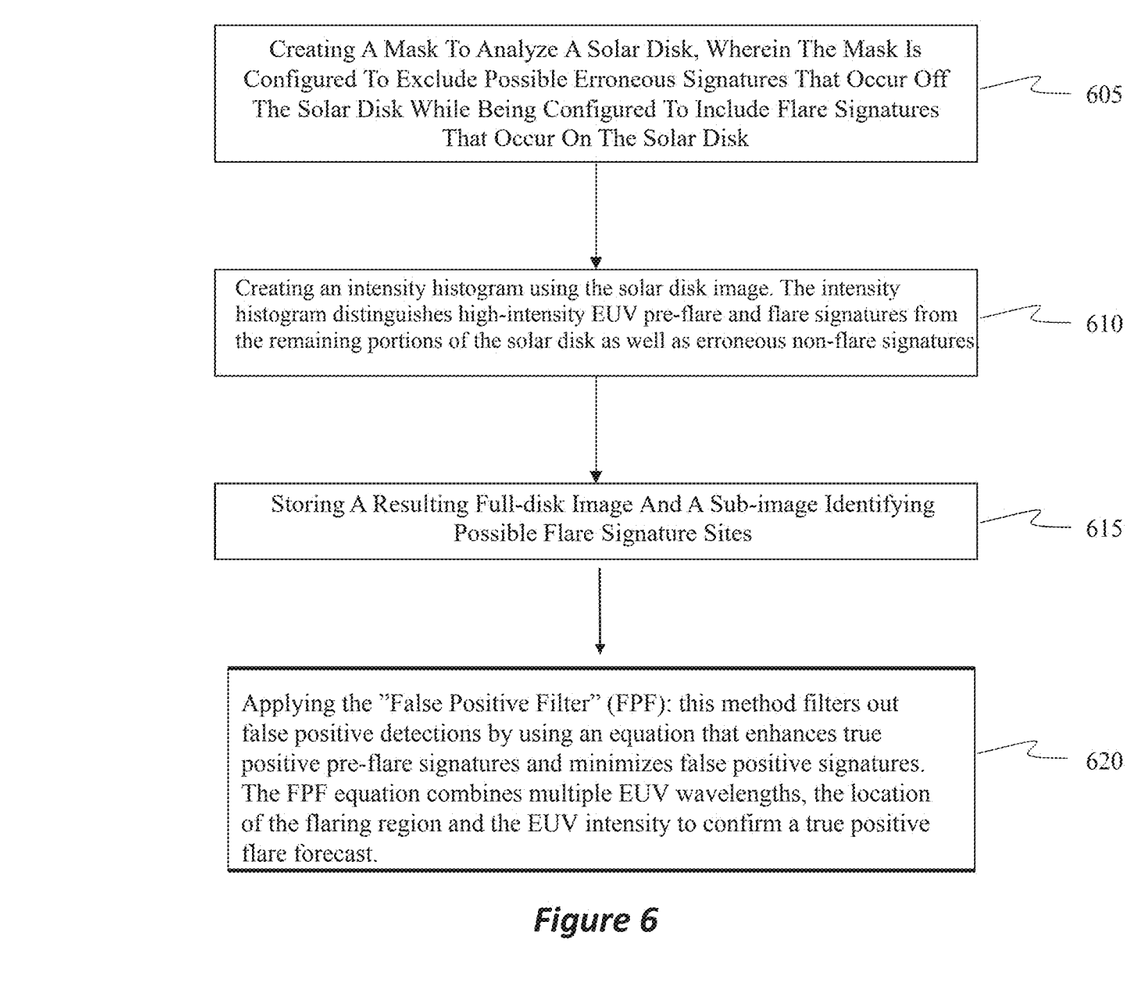
FIG. 6 illustrates a flowchart of an example method for detecting solar flares.

Attention will now be directed to FIG. 6, which illustrates a flowchart of an example method 600 for identifying possible locations of solar flares and for predicting when the solar flares will occur. Method 600 may be performed by a computer system, such as the one that will subsequently be discussed in FIG. 7.

Method 600 includes an act (act 605) of creating a mask to analyze a solar disk. The mask is configured to exclude possible erroneous signatures that occur off the solar disk. The mask is also configured to include flare signatures that occur on the solar disk.

Act 610 involves creating an intensity histogram using the solar disk. The intensity histogram distinguishes high-intensity flare and pre-flare signatures from the remaining portions of the solar disk as well as erroneous non-flare signatures.

Act 615 then involves storing a resulting full-disk image and a sub-image. These images identify possible flare signature sites.

Act 620 involves applying the "False Positive Filter" (FPF): this method filters out false positive detections by using an equation that enhances true positive pre-flare signatures and minimizes false positive signatures. The FPF equation combines multiple EUV wavelengths, the location of the flaring region and the EUV intensity to confirm a true positive flare forecast.

Example Computer/Computer Systems

Figure 7:
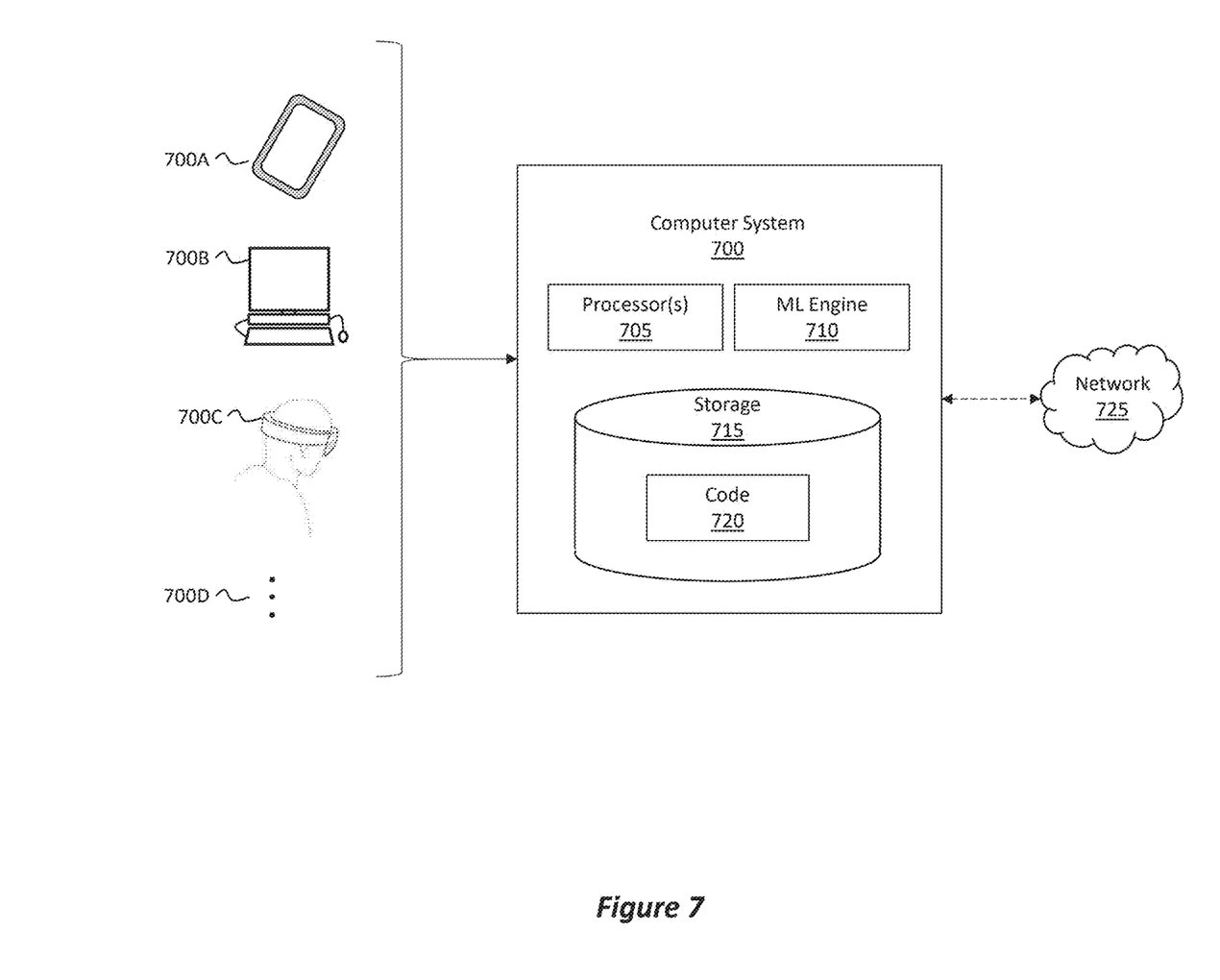
FIG. 7 illustrates an example computer system configured to perform any of the disclosed operations.

Attention will now be directed to FIG. 7 which illustrates an example computer system 700 that may include and/or be used to perform any of the operations described herein. Computer system 700 may take various different forms. For example, computer system 700 may be embodied as a tablet 700A, a desktop or a laptop 700B, a wearable device 700C, a mobile device, or any other standalone device, as represented by the ellipsis 700D. Computer system 700 may also be a distributed system that includes one or more connected computing components/devices that are in communication with computer system 700.

In its most basic configuration, computer system 700 includes various different components. FIG. 7 shows that computer system 700 includes one or more processor(s) 705 (aka a "hardware processing unit"), a ML engine 710, and storage 715.

Regarding the processor(s) 705, it will be appreciated that the functionality described herein can be performed, at least in part, by one or more hardware logic components (e.g., the processor(s) 705). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

The ML engine 710 may be implemented as a specific processing unit (e.g., a dedicated processing unit as described earlier) configured to perform one or more specialized operations for the computer system 700. As used herein, the terms "executable module," "executable component," "component," "module," or "engine" can refer to hardware processing units or to software objects, routines, or methods that may be executed on computer system 700. The different components, modules, engines, and services described herein may be implemented as objects or processors that execute on computer system 700 (e.g. as separate threads).

Any type of ML algorithm, model, machine learning, or neural network may be used. As used herein, reference to "machine learning" or to a ML model or to a "neural network" may include any type of machine learning algorithm or device, neural network (e.g., convolutional neural network(s), multilayer neural network(s), recursive neural network(s), deep neural network(s), dynamic neural network (s), etc.), decision tree model(s) (e.g., decision trees, random forests, and gradient boosted trees), linear regression model (s) or logistic regression model(s), support vector machine (s) ("SVM"), artificial intelligence device(s), or any other type of intelligent computing system. Any amount of training data may be used (and perhaps later refined) to train the machine learning algorithm to dynamically perform the disclosed operations.

Storage 715 may be physical system memory, which may be volatile, non-volatile, or some combination of the two. The term "memory" may also be used herein to refer to non-volatile mass storage such as physical storage media. If computer system 700 is distributed, the processing, memory, and/or storage capability may be distributed as well.

Storage 715 is shown as including executable instructions (i.e. code 720). The executable instructions represent instructions that are executable by the processor(s) 705 (or perhaps even the ML engine 710) of computer system 700 to perform the disclosed operations, such as those described in the various methods.

The disclosed embodiments may comprise or utilize a special-purpose or general-purpose computer including computer hardware, such as, for example, one or more processors (such as processor(s) 705) and system memory (such as storage 715), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 700 may also be connected (via a wired or wireless connection) to external sensors (e.g., one or more remote cameras) or devices via a network 725. For example, computer system 700 can communicate with any number devices or cloud services to obtain or process data. In some cases, network 725 may itself be a cloud network. Furthermore, computer system 700 may also be connected through one or more wired or wireless networks 725 to remote/separate computer systems(s) that are configured to perform any of the processing described with regard to computer system 700.

A "network," like network 725, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 700 will include one or more communication channels that are used to communicate with the network 725. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAS, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for forecasting when solar flares will occur and identifying their possible locations, said method executed on one or more processors and comprising:
   creating a mask to analyze an image of a solar disk;
   creating an intensity histogram using the analyzed image of the solar disk;
   storing a resulting full-disk image and a sub-image identifying possible flare signature sites;
   applying a method to filter out false positive detections of the possible flare signature sites from the full-disk image and the sub-image by using an equation that enhances true positive pre-flare signatures and minimizes false positive signatures;
   predicting a time of an occurrence of a flare; and
   identifying a magnitude of the flare based on a pixel count for precursor signatures for the flare and a pixel count for main signatures for the flare in the full-disk image and the sub-image,
   wherein the precursor signature for an X-ray start time of the flare is observed earlier than a main signature for the X-ray start time of the flare, and
   wherein the pre-flare signatures lead to a flare detection prior to the X-ray start time and before the precursor signature.

2. The computer-implemented method as recited in claim 1, wherein the mask is configured to exclude possible erroneous signatures that occur on or off the solar disk while being configured to include pre-flare signatures that occur on the solar disk.

3. The computer-implemented method as recited in claim 1, wherein the intensity histogram distinguishes high-intensity flare and pre-flare signatures from remaining portions of the solar disk.

4. The computer-implemented method as recited in claim 1, further comprising storing physical properties of flare signatures, the physical properties including one or more of heliographic location, EUV intensity peak, pixel count, or corresponding running difference values.

5. The computer-implemented method as recited in claim 1, further comprising grouping, with a spatial discriminator, high-intensity pixels based on their spatial proximity.

6. The computer-implemented method as recited in claim 5, further comprising grouping high-intensity pixels within 10 degree regions to distinguish activity in other regions.

7. The computer-implemented method as recited in claim 6, further comprising summing signals within a group and treating the summed signals as one source.

8. The computer-implemented method as recited in claim 7, further comprising flagging as possible pre-flare activity any of the summed signals that cross a threshold.

9. The computer-implemented method as recited in claim 7, further comprising identifying a region associated with each possible pre-flare activity.

10. The computer-implemented method as recited in claim 1, wherein the image of the solar disk is captured at 304 Å wavelength observations.

11. A computer system for forecasting when solar flares will occur and identifying their possible locations, comprising:
    one or more processors; and
    one or more computer-readable media having stored thereon executable instructions that when executed by the one or more processors configure the computer system to:
    create a mask to analyze an image of a solar disk;
    create an intensity histogram using the analyzed image of the solar disk;
    store a resulting full-disk image and a sub-image identifying possible flare signature sites;
    apply a method to filter out false positive detections of the possible flare signature sites from the full-disk image and the sub-image by using an equation that enhances true positive pre-flare signatures and minimizes false positive signatures;
    predict a time of an occurrence of a flare; and
    identify a magnitude of the flare based on a pixel count for precursor signatures for the flare and a pixel count for main signatures for the flare in the full-disk image and the sub-image,
    wherein the precursor signature for an X-ray start time of the flare is observed earlier than a main signature for the X-ray start time of the flare, and
    wherein the pre-flare signatures lead to a flare detection prior to the X-ray start time and before the precursor signature.

12. The computer system as recited in claim 11, wherein the mask is configured to exclude possible erroneous signatures that occur on or off the solar disk while being configured to include pre-flare signatures that occur on the solar disk.

13. The computer system as recited in claim 11, wherein the intensity histogram distinguishes high-intensity flare and pre-flare signatures from remaining portions of the solar disk.

14. The computer system as recited in claim 11, wherein the executable instructions include instructions that are executable to configure the computer system to store physical properties of flare signatures, the physical properties including one or more of heliographic location, EUV intensity peak, pixel count, or corresponding running difference values.

15. The computer system as recited in claim 11, wherein the executable instructions include instructions that are executable to configure the computer system to group, with a spatial discriminator, high-intensity pixels based on their spatial proximity.

16. The computer system as recited in claim 15, wherein the executable instructions include instructions that are executable to configure the computer system to group high-intensity pixels within 10 degree regions to distinguish activity in other regions.

17. The computer system as recited in claim 16, wherein the executable instructions include instructions that are executable to configure the computer system to sum signals within a group and treating the summed signals as one source.

18. The computer system as recited in claim 17, wherein the executable instructions include instructions that are executable to configure the computer system to flag as possible pre-flare activity any of the summed signals that cross a threshold.

19. The computer system as recited in claim 18, wherein the executable instructions include instructions that are executable to configure the computer system to identify a region associated with each possible pre-flare activity.

20. The computer system as recited in claim 11, wherein the image of the solar disk is captured at 304 Å wavelength observations.

\* \* \* \* \*